(12) United States Patent
Woo et al.

(10) Patent No.: US 9,618,805 B2
(45) Date of Patent: Apr. 11, 2017

(54) LIQUID CRYSTAL DISPLAY

(71) Applicant: LG Display Co., Ltd., Seoul (KR)

(72) Inventors: Changseung Woo, Gyeonggi-do (KR); Soonhwan Hong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/945,669

(22) Filed: Nov. 19, 2015

(65) Prior Publication Data
US 2016/0313614 A1    Oct. 27, 2016

(30) Foreign Application Priority Data

Apr. 21, 2015  (KR) .................. 10-2015-0056172
Sep. 3, 2015   (KR) .................. 10-2015-0125102

(51) Int. Cl.
*G02F 1/1333*   (2006.01)
*G02F 1/1343*   (2006.01)
*G02F 1/1339*   (2006.01)
*G02F 1/1362*   (2006.01)
*G02F 1/1335*   (2006.01)
(Continued)

(52) U.S. Cl.
CPC ...... *G02F 1/134309* (2013.01); *G02F 1/1337* (2013.01); *G02F 1/13394* (2013.01); *G02F 1/133345* (2013.01); *G02F 1/133512* (2013.01); *G02F 1/133711* (2013.01); *G02F 1/133788* (2013.01); *G02F 1/134363* (2013.01); *G02F 1/136204* (2013.01); *G02F 1/136286* (2013.01); *G02F 1/133707* (2013.01); *G02F 1/136227* (2013.01); *G02F 2001/134318* (2013.01); *G02F 2001/134372* (2013.01); *G09G 3/3614* (2013.01); *G09G 2300/0426* (2013.01)

(58) Field of Classification Search
CPC .................. G02F 1/1337; G02F 1/133345
See application file for complete search history.

(56) References Cited

U.S. PATENT DOCUMENTS 6,704,084 B2 *  3/2004  Kodate ............ G02F 1/134363
                                                    349/123
6,958,799 B2 * 10/2005  Tomioka .......... G02F 1/134363
                                                    349/106
(Continued)

FOREIGN PATENT DOCUMENTS

WO    2004029921 A2    4/2004

OTHER PUBLICATIONS

Extended European Search Report dated Sep. 8, 2016 for the corresponding European patent application No. 15189705.5.
(Continued)

*Primary Examiner* — Sang V Nguyen
(74) *Attorney, Agent, or Firm* — Morgan, Lewis & Bockius LLP

(57) ABSTRACT

A disclosed liquid crystal display includes an upper plate and a lower plate with a liquid crystal layer interposed therebetween. The display also includes a spacer positioned between the upper plate and the lower plate. The lower plate includes a lower electrode, an insulating layer over the lower electrode, an upper electrode over the insulating layer, and an alignment layer connected to the lower electrode and the upper electrode. The alignment layer is connected to the lower electrode through a hole passing through the insulating layer.

14 Claims, 20 Drawing Sheets

(51) Int. Cl.
*G02F 1/1337* (2006.01)
*G09G 3/36* (2006.01)

(56) References Cited

U.S. PATENT DOCUMENTS

| | | | |
|---|---|---|---|
| 2010/0165277 A1* | 7/2010 | Hwang | G02F 1/1337 349/123 |
| 2011/0051064 A1* | 3/2011 | Matsumori | G02F 1/133711 349/123 |
| 2011/0216278 A1 | 9/2011 | Nagano et al. | |
| 2012/0327331 A1* | 12/2012 | Yim | G02F 1/1362 349/62 |
| 2013/0162570 A1* | 6/2013 | Shin | G06F 3/041 345/173 |
| 2014/0139796 A1 | 5/2014 | Cao et al. | |
| 2014/0218667 A1* | 8/2014 | Miyachi | G02F 1/133703 349/99 |
| 2014/0247411 A1 | 9/2014 | Kim et al. | |
| 2015/0309377 A1* | 10/2015 | Choi | G02F 1/133514 349/43 |

OTHER PUBLICATIONS

Falu Yang, et al., "High Performance Advanced Super Dimension Switch (ADS) Mode LCD with Negative Dielectric Anisotropy LC Optimization," SID 2014 Digest, pp. 318-321 (2014).

* cited by examiner

LIQUID CRYSTAL DISPLAY

This application claims the benefit of Korean Patent Application No. 10-2015-0056172 filed on Apr. 21, 2015, and No. 10-2015-0125102 filed on Sep. 3, 2015, the entire contents of which are incorporated herein by reference for all purposes as if fully set forth herein.

BACKGROUND OF THE INVENTION

Field of the Invention

The present invention relates to a liquid crystal display, and more particularly, to a liquid crystal display having a low speed driving mode.

Discussion of the Related Art

Various flat panel displays, such as a liquid crystal display (LCD), a plasma display panel (PDP), an organic light emitting diode (OLED) display, and an electrophoresis display (EPD), have been developed. A liquid crystal display displays an image by controlling an electric field applied to liquid crystal molecules based on a data voltage. An active matrix liquid crystal display includes a thin film transistor (TFT) in each pixel.

A liquid crystal display may include a liquid crystal display panel, a backlight unit irradiating light onto the liquid crystal display panel, source driver integrated circuits (ICs) for supplying a data voltage to data lines of the liquid crystal display panel, gate driver ICs for supplying gate pulses (or scan pulses) to gate lines (or scan lines) of the liquid crystal display panel, a control circuit for controlling the source driver ICs and the gate driver ICs, a light source driving circuit for driving light sources of the backlight unit, and the like.

When a DC voltage is applied to the liquid crystal in a liquid crystal display, image persistence may be generated. The image persistence is a phenomenon in which a previous image is seen although a screen image has been updated. The image persistence appears more prominently when a static image is displayed on the liquid crystal display for a long period of time or an application time of the DC voltage applied to the liquid crystals increases. An example of a mechanism generating the image persistence is a phenomenon in which impurity ions in a liquid crystal layer are accumulated on an alignment layer for setting a pretilt angle of liquid crystal molecules. Negatively charged ions and positively charged ions based on a polarity of an electric field applied to the liquid crystal molecules move along a motion vector and are polarized in opposite directions. Because the motion vector is not changed, an amount of impurity ions accumulated on the alignment layer increases as time passes. An increase in the amount of impurity ions affects a movement characteristic tending to return to an initial alignment state of the liquid crystal molecules, thereby generating the image persistence.

A liquid crystal display may operate in a low speed driving mode so as to reduce power consumption and may reduce a frame rate or a frame frequency when an input image is a static image. However, when the frame frequency is reduced, a luminance may be suddenly changed each time the data voltage is changed. Further, because a voltage discharge time of the pixel increases, a flicker phenomenon, in which the image flickers, may be generated.

Moreover, the low speed driving mode is susceptible to the image persistence problem because the application time of the DC voltage applied to the liquid crystal increases. Thus, there is a need for a method capable of preventing or lessening a reduction in image quality of the liquid crystal display in the low speed driving mode.

SUMMARY OF THE INVENTION

Accordingly, the present invention is directed to a liquid crystal display that substantially obviates one or more of the problems due to limitations and disadvantages of the related art.

The present invention provides a liquid crystal display capable of preventing or lessening a reduction in image quality in a low speed driving mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes: an upper plate and a lower plate with a liquid crystal layer interposed therebetween; and a spacer positioned between the upper plate and the lower plate, wherein the lower plate has a lower electrode, an insulating layer over the lower electrode, an upper electrode over the insulating layer, and an alignment layer connected to the lower electrode and the upper electrode, wherein the alignment layer is connected to the lower electrode through a hole passing through the insulating layer.

In another aspect, a liquid crystal display includes: an upper plate and a lower plate; and a liquid crystal layer between the upper plate and the lower plate, wherein the lower plate has a lower electrode, an insulating layer over the lower electrode, an upper electrode over the insulating layer and overlapping the lower electrode to form a storage capacitor with the lower electrode, and an alignment layer connected to the lower electrode and the upper electrode to form a discharge path of ions accumulated on the alignment layer, wherein the alignment layer is connected to the lower electrode through a hole passing through the insulating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. A detailed description may be omitted below for known or conventional features.

Figure 1:
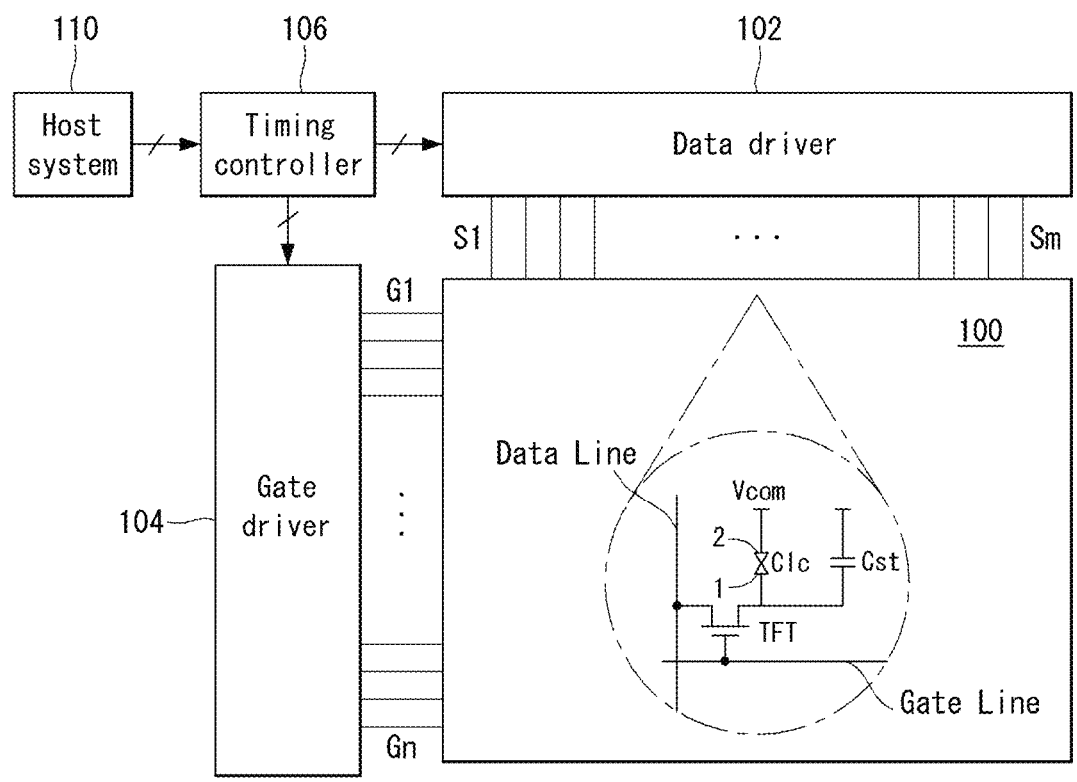
FIG. 1 is a block diagram showing a liquid crystal display according to an example embodiment of the invention.

As shown in FIG. 1, a liquid crystal display according to an example embodiment of the invention includes, among other things, a display panel 100 including a pixel array and a display panel driver for writing data of an input image on the display panel 100. A backlight unit for uniformly irradiating light onto the display panel 100 may be disposed under the display panel 100.

The liquid crystal display according to the example embodiment of the invention may be implemented as any type of liquid crystal display, including a transmissive liquid crystal display, a transflective liquid crystal display, and a reflective liquid crystal display. The transmissive liquid crystal display and the transflective liquid crystal display may require a backlight unit. The backlight unit may be implemented as a direct type backlight unit or an edge type backlight unit.

The display panel 100 may include an upper plate and a lower plate, which are positioned opposite each other with a liquid crystal layer interposed therebetween. The pixel array of the display panel 100 includes pixels arranged in a matrix form based on a crossing structure of data lines S1 to Sm and gate lines G1 to Gn. Each pixel is configured to adjust a transmission amount of light using liquid crystal molecules driven by a voltage difference between a pixel electrode 1, charged to a data voltage through a thin film transistor (TFT), and a common electrode 2, to which a common voltage Vcom is supplied.

The lower plate of the display panel 100 may include, among other things, the data lines S1 to Sm, the gate lines G1 to Gn, the common electrode 2, thin film transistors (TFTs), the pixel electrodes 1 connected to the TFTs, and storage capacitors Cst connected to the pixel electrodes 1. Each TFT is respectively formed in each subpixel and is connected to the pixel electrode 1. The TFT may be implemented as an amorphous silicon (a-Si) TFT, a low temperature polysilicon (LTPS) TFT, an oxide TFT, or the like. The TFTs are respectively connected to the pixel electrodes 1 of the subpixels. The common electrode 2 and the pixel electrode 1 may be separated from each other with an insulating layer interposed therebetween.

A color filter array including black matrixes and color filters may be formed on the upper plate of the display panel 100.

The liquid crystal layer is formed between the upper plate and the lower plate of the display panel 100. Polarizing plates may be respectively attached to the upper plate and the lower plate of the display panel 100. Alignment layers for setting a pretilt angle of liquid crystals may be respectively formed on the upper plate and the lower plate of the display panel 100. The alignment layer may be formed of a polymer material capable of being photoaligned, for example, polyimide. A spacer for maintaining a cell gap of a liquid crystal cell Clc may be formed between the upper plate and the lower plate of the display panel 100.

The example embodiment of the invention brings the alignment layer into contact with the common electrode 2 and the pixel electrode 1, and forms a discharge path on the alignment layer, so as to reduce image persistence and a flicker of the liquid crystal display.

The example embodiment of the invention may implement an oxide TFT as the TFT of the pixel array and implement the liquid crystal layer using negative liquid crystals (nLC), so as to further improve image quality of the liquid crystal display in a low speed driving mode. Further, photoalignment processing may be performed on the alignment layer.

Because a leakage current of the oxide TFT in an off-state is very low, a discharge of the pixels can be suppressed in the low speed driving mode. The oxide TFT may be applied to a liquid crystal display using an etch stopper ES (shown, for example, in FIGS. 8 and 9) and also may be applied to a back channel etch (BCE) liquid crystal display.

The photoalignment layer may improve a contrast ratio by reducing a light leakage phenomenon. An ultraviolet ray may be irradiated onto the photoalignment layer in an alignment process of the liquid crystal molecules. The photoalignment layer causes the pretilt angle of the liquid crystal to be close to zero and can implement substantially uniform image quality irrespective of a viewing angle.

Because a transmittance of the negative liquid crystal is greater than a transmittance of a positive liquid crystal, the negative liquid crystals may improve a luminance of an image. The negative liquid crystal is a liquid crystal in which a difference between a dielectric constant of a long axis and a dielectric constant of a short axis is a negative value. When a voltage is applied to the negative liquid crystal, a short axis of a liquid crystal molecule is parallel to an electric field E.

The display panel driver may include a data driver 102 and a gate driver 104. The display panel driver operates in the low speed driving mode when a static image is input under the control of a timing controller 106, and operates in a normal driving mode when a moving picture is input under the control of the timing controller 106. A frame frequency (or a frame rate) in the low speed driving mode is lower than a frame frequency in the normal driving mode.

The data driver 102 may include a plurality of source driver ICs. Data output channels of the source driver ICs may be connected to the data lines S1 to Sm of the pixel array. The source driver ICs may be configured to receive digital video data of the input image from the timing controller 106. The source driver ICs convert the digital video data of the input image into positive and negative gamma compensation voltages under the control of the timing controller 106 and output positive and negative data voltages. An output voltage of the source driver ICs may be supplied to the data lines S1 to Sm. Because a frame frequency of each of the source driver ICs of the data driver 102 is reduced in the low speed driving mode, an operating frequency of each source driver IC is reduced.

Each source driver IC may invert a polarity of the data voltage to be supplied to the pixels under the control of the timing controller 106 and output it to the data lines S1 to Sm. The source driver ICs maintain the polarity of the data voltage applied to the data lines S1 to Sm during one frame period and then may invert the polarity of the data voltage in each successive frame period. A length of one frame period in the low speed driving mode is increased due to the reduced frame frequency.

The gate driver 104 sequentially supplies gate pulses synchronized with the data voltage to the gate lines G1 to Gn under the control of the timing controller 106. The gate pulses output from the gate driver 104 may be synchronized with the positive and negative data voltages, to which the pixels will be charged. The gate driver 104 may be directly formed on the lower plate of the display panel 100 along with the pixel array, so as to reduce the cost of gate driver ICs. Because a frame frequency of the gate driver 104 is reduced in the low speed driving mode, an operating frequency of the gate driver 104 is reduced.

The timing controller 106 may be configured to transmit the digital video data of the input image received from a host system 110 to the data driver 102. The timing controller 106 receives timing signals synchronized with the data of the input image from the host system 110. The timing signals may include, but are not limited to, a vertical sync signal Vsync, a horizontal sync signal Hsync, a data enable signal DE, and a clock CLK. The timing controller 106 may control operation timings of the data driver 102 and the gate driver 104 based on the timing signals Vsync, Hsync, DE, and CLK received along with pixel data of the input image. The timing controller 106 may transmit a polarity control signal for controlling a polarity of the pixel array to each of the source driver ICs of the data driver 102.

The timing controller 106 may control the operation timing of the display panel driver at a frame frequency (unit: Hz) of {(a frame frequency of the input image)×N} in the normal driving mode, where N is a positive integer. The frame frequency of the input image in the normal driving mode is 60 Hz in a NTSC (National Television Standards Committee) format and is 50 Hz in a PAL (Phase-Alternating Line) format. The frame frequency of the input image in the low speed driving mode may be reduced to 1 Hz to 30 Hz, but is not limited thereto.

The host system 110 may be one of a television system, a set-top box, a navigation system, a DVD player, a Blu-ray player, a personal computer (PC), a home theater system, a phone system, and other systems that include or operate in conjunction with a display.

The liquid crystal display according to an example embodiment of the invention may further include a power unit (not shown). The power unit may generate voltages required to drive the display panel 100 using a DC-DC converter. The voltages may include a high potential power voltage Vdd, a logic power voltage Vcc, a gamma reference voltage, a gate high voltage VGH, a gate low voltage VGL, a common voltage Vcom, and the like. The high potential power voltage Vdd is a maximum value of the data voltage, to which the pixels of the display panel 100 may be charged. The logic power voltage Vcc is a power voltage for driving the timing controller 106, the source driver ICs of the data driver 102, and the gate driver ICs of the gate driver 104. The gate high voltage VGH is a high logic voltage of the gate pulse, which is set to be equal to or greater than a threshold voltage of the TFTs of the pixel array. The gate low voltage VGL is a low logic voltage of the gate pulse, which is set to be less than the threshold voltage of the TFTs of the pixel array. The gate high voltage VGH and the gate low voltage VGL are supplied to the gate driver 104. The gate pulse swings between the gate high voltage VGH and the gate low voltage VGL. The common voltage Vcom is supplied to the common electrode 2 of the liquid crystal cells Clc. The power unit may divide the high potential power voltage Vdd and generate the gamma reference voltage. The gamma reference voltage is supplied to the source driver ICs of the data driver 102. The source driver ICs may divide the gamma reference voltage and generate positive and negative gamma compensation voltages of each gray level. The source driver ICs may convert the digital video data into the positive and negative gamma compensation voltages and output the data voltage.

Figure 2:
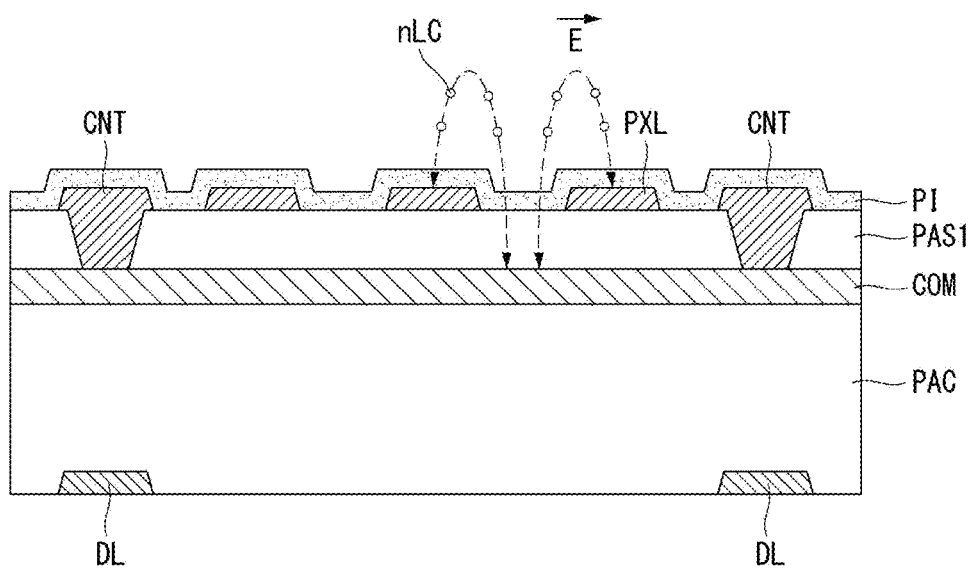
FIG. 2 shows a structure of a lower plate of a liquid crystal display according to a first example embodiment of the invention.

FIG. 2 shows a structure of a lower plate of a liquid crystal display according to a first example embodiment of the invention.

As shown in FIG. 2, the liquid crystal display according to the first example embodiment of the invention includes a pixel electrode PXL disposed over a common electrode COM with an insulating layer interposed therebetween, a conductive connector CNT contacting the common electrode COM, and an alignment layer PI contacting the pixel electrode PXL and the conductive connector CNT. A passivation layer PAS1 is an insulating layer formed between the common electrode COM and the pixel electrode PXL. Because the conductive connector CNT is connected to the common electrode COM, the conductive connector CNT may be a portion of the common electrode COM.

In the first example embodiment of the invention, the common electrode COM is a lower electrode positioned under the pixel electrode PXL, and the pixel electrode PXL is an upper electrode.

The conductive connector CNT may be formed on the same level as the pixel electrode PXL, fill in a contact hole passing through the passivation layer PAS1, and contact the common electrode COM. The conductive connector CNT contacts the alignment layer PI. The conductive connector CNT may be formed of the same material as the pixel electrode PXL and be patterned at the same time as the pixel electrode PXL, but it may also be formed in a different manner. The conductive connector CNT may be formed of a metal material different from the pixel electrode PXL. The conductive connector CNT connects the alignment layer PI, which is connected to the pixel electrode PXL, to the common electrode COM, and forms a discharge path of ions accumulated on the alignment layer PI. The conductive connector CNT may cover the common electrode COM and prevents the common electrode COM from being etched in a process for etching the pixel electrode PXL. Further, the conductive connector CNT may prevent an increase in a height difference in a connection portion between the alignment layer PI and the common electrode COM.

The common electrode COM may be formed on an organic passivation layer PAC. The conductive connector CNT may overlap one of a data line DL and a spacer in a plan view, so as to minimize a reduction in an aperture ratio of the pixel. Alternatively, the conductive connector CNT may overlap both the data line DL and the spacer.

The black matrix (not shown) may overlap the TFT, the data line DL, the gate line GL, the spacer, and the conductive connector CNT, so that the above components are not seen.

Figure 3:
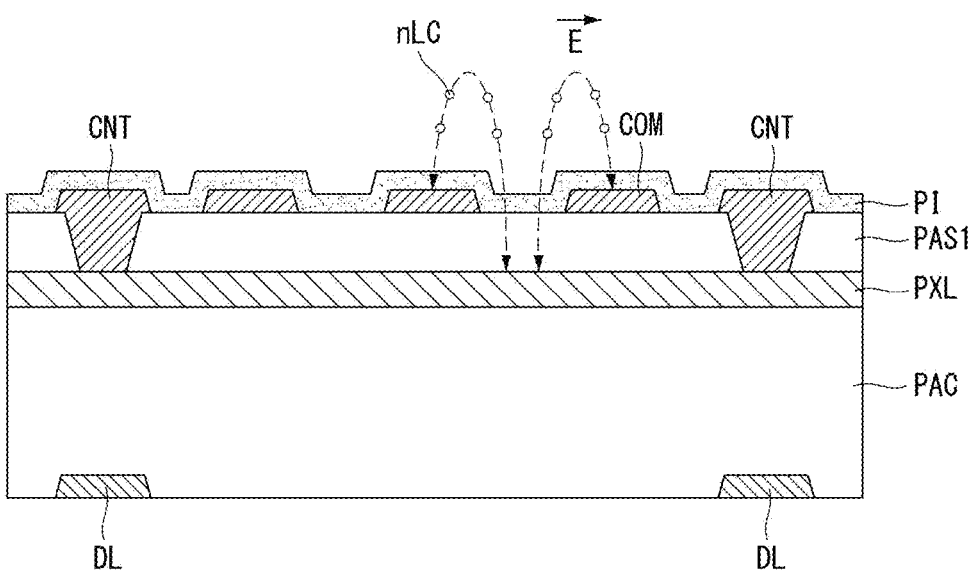
FIG. 3 shows a structure of a lower plate of a liquid crystal display according to a second example embodiment of the invention.

FIG. 3 shows a structure of a lower plate of a liquid crystal display according to a second example embodiment of the invention.

As shown in FIG. 3, the liquid crystal display according to the second example embodiment of the invention includes a common electrode COM disposed over a pixel electrode PXL with an insulating layer interposed therebetween, a conductive connector CNT contacting the pixel electrode PXL, and an alignment layer PI contacting the common electrode COM and the conductive connector CNT. A passivation layer PAS1 is an insulating layer formed between the common electrode COM and the pixel electrode PXL. Because the conductive connector CNT is connected to the pixel electrode PXL, the conductive connector CNT may be a portion of the pixel electrode PXL.

In the second example embodiment of the invention, the pixel electrode PXL is a lower electrode positioned under the common electrode COM, and the common electrode COM is an upper electrode.

The conductive connector CNT may be formed on the same level as the common electrode COM, fill in a contact hole passing through the passivation layer PAS1, and contact the pixel electrode PXL. The conductive connector CNT contacts the alignment layer PI. The conductive connector CNT may be formed of the same material as the common electrode COM and may be patterned at the same time as the common electrode COM, but it may also be formed in a different manner. The conductive connector CNT may be formed of a metal material different from the common electrode COM. The conductive connector CNT connects the pixel electrode PXL to the alignment layer PI, which is connected to the common electrode COM, and forms a discharge path of ions accumulated on the alignment layer PI. The conductive connector CNT may cover the pixel electrode PXL and prevent the pixel electrode PXL from being etched in a process for etching the common electrode COM. Further, the conductive connector CNT may prevent an increase in a height difference in a connection portion between the alignment layer PI and the common electrode COM.

The pixel electrode PXL may be formed on an organic passivation layer PAC. The conductive connector CNT may overlap a data line DL or a spacer, or both, in a plan view, so as to minimize a reduction in an aperture ratio of the pixel. A black matrix (not shown) may overlap the TFT, the data line DL, the gate line GL, and the spacer, so that the above components are not seen.

An image persistence and flicker experiment was conducted on an example embodiment of the invention with various alignment layers, each having a different resistance. According to the image persistence experiment, because a discharge path of ions was formed when the alignment layer contacted the pixel electrode PXL and the common electrode COM, the image persistence and flicker problems were mitigated. The image persistence and flicker problems were mitigated even when the resistance of the alignment layer PI was high. Further, the image persistence experiment was conducted at various ratios of a contact area between the alignment layer PI and the pixel electrode PXL to a contact area between the alignment layer and the common electrode COM. The image persistence problem was mitigated even when this ratio was changed.

Figure 4A:
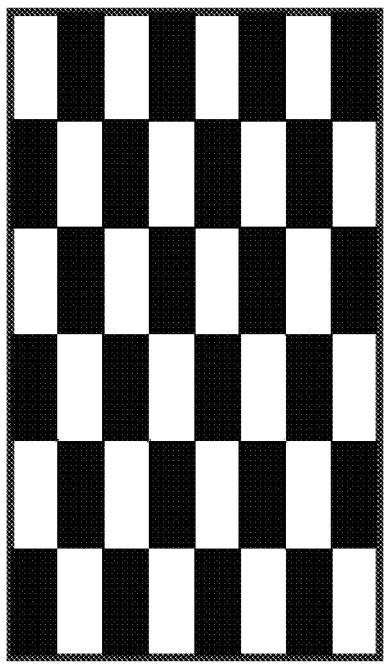
FIGS. 4A and 4B show respective results of an image persistence experiment conducted on a related art device and an example embodiment of the invention.
Figure 4A:
Figure 4A:
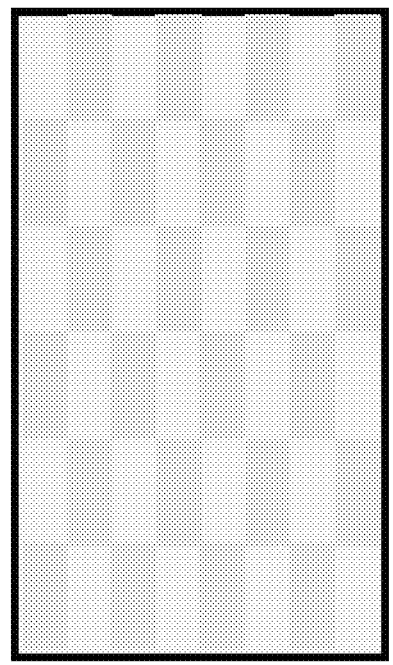
Figure 4B:
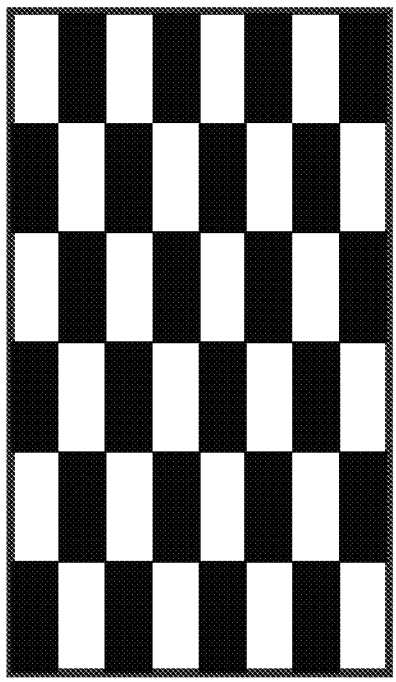
Figure 4B:
Figure 4B:
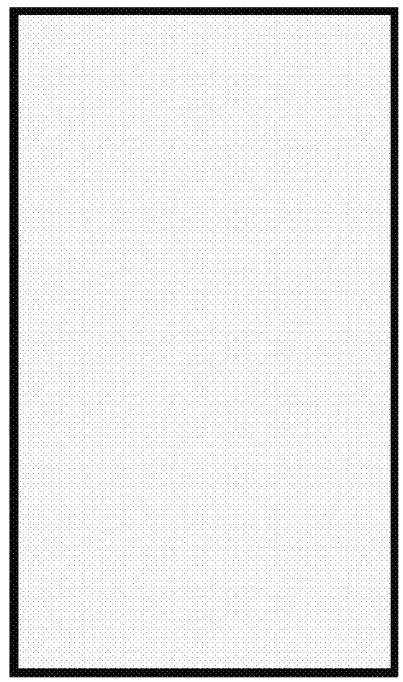

FIGS. 4A and 4B show respective results of an image persistence and flicker experiment for a related art device and an example embodiment of the invention. In this experiment, a sample selected as the related art device is a liquid crystal display in which a common electrode COM and a pixel electrode PXL are separated from each other with an insulating layer interposed therebetween and an alignment layer PI is connected only to the pixel electrode PXL. Also, in this experiment, a sample selected as the example embodiment of the invention is a liquid crystal display according to an example embodiment shown in FIGS. 7 to 9 including the lower plate of the structure shown in FIG. 2.

The image persistence and flicker experiment tests whether or not the image persistence is generated when white gray level blocks and black gray level blocks are displayed and maintained on the screen of the liquid crystal display for a predetermined period of time, and then a gray level of the pixel data is changed to a middle gray level, for example, "127", throughout the entire screen of the liquid crystal display. As a result of the image persistence experiment, the image persistence was generated in the related art device, as shown in FIG. 4A. In contrast, the image persistence was not generated in the example embodiment of the invention, as shown in FIG. 4B.

Figure 5A:
FIGS. 5A and 5B show an image pattern of a sample used in an image persistence experiment.
Figure 5B:

FIGS. 5A and 5B illustrate an image pattern of a sample used in the image persistence experiment.

FIG. 5A shows pixels of a white gray level block in a solid pattern for inducing the image persistence in the liquid crystal display. In the case of a solid pattern, after a white gray level voltage is supplied to positive pixels and negative pixels of the white gray level block for a predetermined period of time, a middle gray level voltage is supplied to the positive pixels and the negative pixels of the white gray level block. Also or alternatively, after a black gray level voltage is supplied to positive pixels and negative pixels of the black gray level block for a predetermined period of time, a middle gray level voltage is supplied to the positive pixels and the negative pixels of the black gray level block. The positive pixels are pixels to which the positive data voltage is supplied, and the negative pixels are pixels to which the negative data voltage is supplied. The polarity of the data voltage is inverted on a per frame basis.

FIG. 5B shows pixels of a white gray level block in a flicker pattern for inducing the flicker in the liquid crystal display. In the case of a flicker pattern, after a white gray level voltage is supplied to pixels of a first polarity in the white gray level block and a black gray level voltage is supplied to pixels of a second polarity in the white gray level block for a predetermined period of time, a middle gray level voltage is supplied to the pixels of both polarities. The first polarity may be a positive polarity or a negative polarity, and the second polarity is a polarity different from the first polarity.

As shown in FIGS. 6A to 6E, the image persistence experiment was conducted at various different ratios of a contact area between the alignment layer PI and the pixel electrode PXL to a contact area between the alignment layer PI and the common electrode COM. With the example embodiment of the invention, the image persistence problem was mitigated even at the various different ratios. In FIGS. 6A to 6E, the size of the contact area between the alignment layer PI and the pixel electrode PXL is not changed, and the size of the contact area between the alignment layer PI and the common electrode COM is changed. As shown in FIGS. 6A to 6E, the size of the contact area between the alignment layer PI and the common electrode COM is changed depending on changes in the number and the size of conductive connectors CNT.

Figure 9:
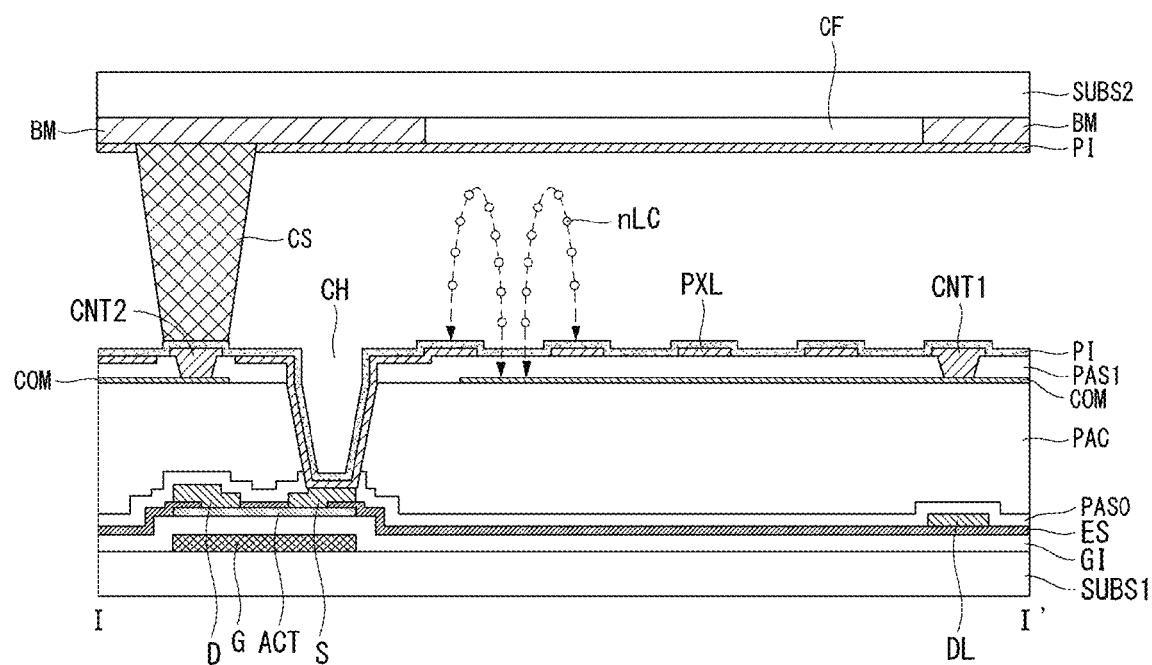
FIG. 9 is a cross-sectional view showing conductive connectors overlapping a data line and a column spacer in a liquid crystal display according to the first example embodiment of the invention.

The alignment layer PI contacts the common electrode COM through conductive connectors CNT, CNT1, and CNT2 disposed to overlap the data line DL or a column spacer CS, and directly contacts the pixel electrode PXL. In FIG. 6E, "CNT1" is a first conductive connector disposed over a data line DL, and "CNT2" is a second conductive connector overlapping a column spacer CS in a plan view. The conductive connectors CNT, CNT1, and CNT2 may overlap the black matrix BM and be covered by the black matrix BM. FIG. 9 is a cross-sectional view showing the conductive connectors CNT1 and CNT2 shown in FIG. 6E.

According to the result of the image persistence and flicker experiment, the mitigation of the image persistence problem was confirmed as indicated by the following Table 1 even when the ratio of the contact area between the alignment layer PI and the pixel electrode PXL to the contact area between the alignment layer PI and the common electrode COM was changed between 2:1 and 6:1.

Figure 7:
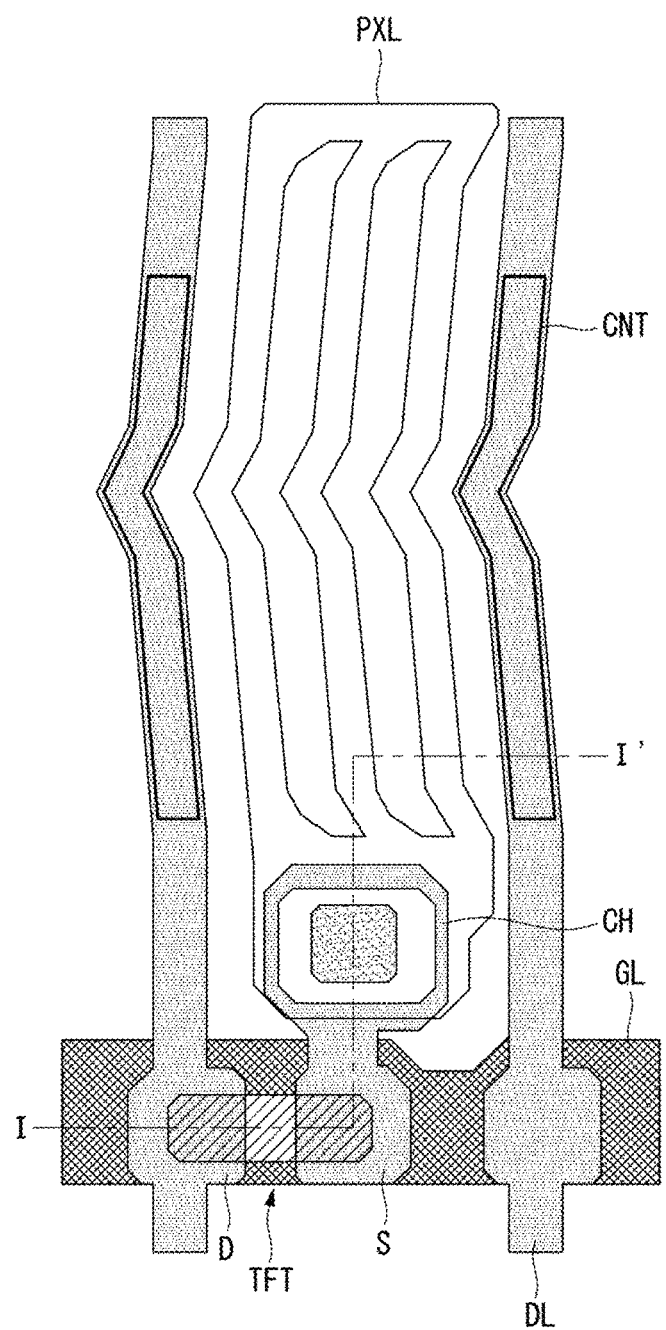
FIG. 7 is an enlarged plan view of one subpixel in a liquid crystal display according to a first example embodiment of the invention.
Figure 8:
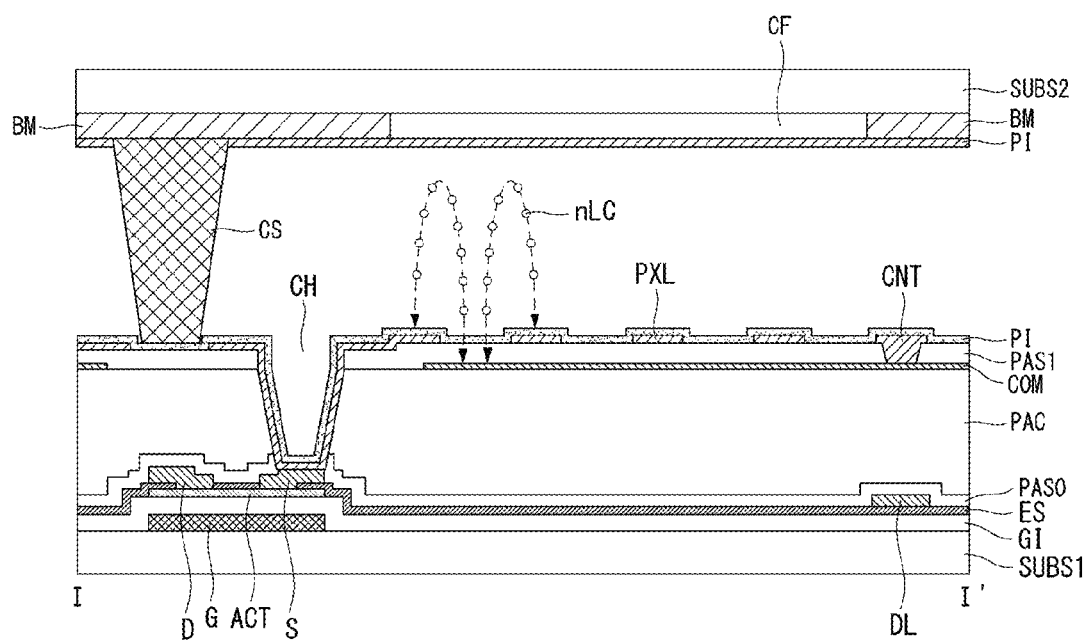
FIG. 8 is a cross-sectional view taken along line I-I' in FIG. 7 and shows a cross-sectional structure of a liquid crystal display according to the first example embodiment of the invention.

As shown in FIGS. 7 to 9, the lower plate may include a TFT, a gate insulating layer GI, an etch stopper ES, a first inorganic passivation layer PAS0, an organic passivation layer PAC, a common electrode COM, a second inorganic passivation layer PAS1, a conductive connector CNT, a pixel electrode PXL, and a lower alignment layer PI.

The gate line GL and a gate electrode G of the TFT are formed on a lower substrate SUBS1. The gate insulating layer GI is formed of an inorganic insulating material, such as SiOx and SiNx, and covers the gate electrode G of the TFT. The gate electrode G of the TFT may be integrated with the gate line GL. A semiconductor pattern ACT is formed on the gate insulating layer GI and overlaps the gate electrode G of the TFT. The semiconductor pattern ACT is formed of a semiconductor material, such as amorphous silicon (a-Si), low temperature polysilicon (LTPS), and oxide semiconductor, and is used as an active channel layer of the TFT. A source electrode S and a drain electrode D of the TFT are formed on the semiconductor pattern ACT and may overlap the gate electrode G of the TFT. The drain electrode D of the TFT may be integrated with the data line DL. The source electrode S of the TFT may contact the pixel electrode PXL through a contact hole CH passing through the first inorganic passivation layer PAS0, the organic passivation layer PAC, and the second inorganic passivation layer PAS1. The etch stopper ES is formed of an inorganic insulating material, such as SiOx, and is formed on the semiconductor pattern ACT and the gate insulating layer GI. The etch stopper ES protects the semiconductor pattern ACT from an etchant when the source electrode S and the drain electrode D of the TFT are etched. The first inorganic passivation layer PAS0 is formed of an inorganic insulating material, such as SiOx and SiNx, and covers the TFT and the etch stopper ES. The organic passivation layer PAC is formed of an organic insulating material, such as photo-acryl, and covers the first inorganic passivation layer PAS0. The common electrode COM, the conductive connector CNT, and the pixel electrode PXL may be formed of a transparent electrode material, such as indium tin oxide (ITO).

TABLE 1

Figure 6A:
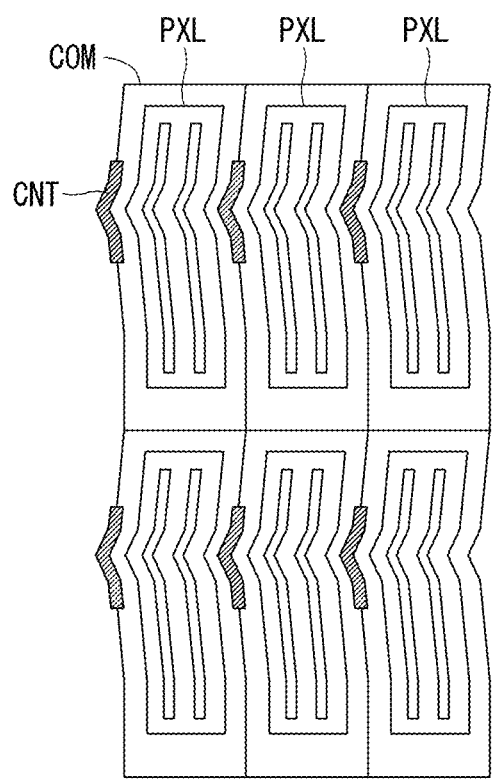
FIGS. 6A to 6E show various example ratios of a contact area between an alignment layer and a pixel electrode to a contact area between the alignment layer and a common electrode.
Figure 6B:
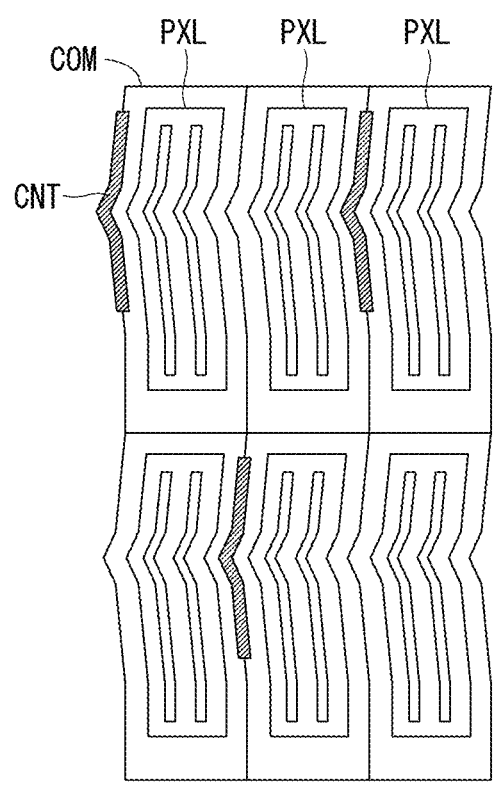
Figure 6C:
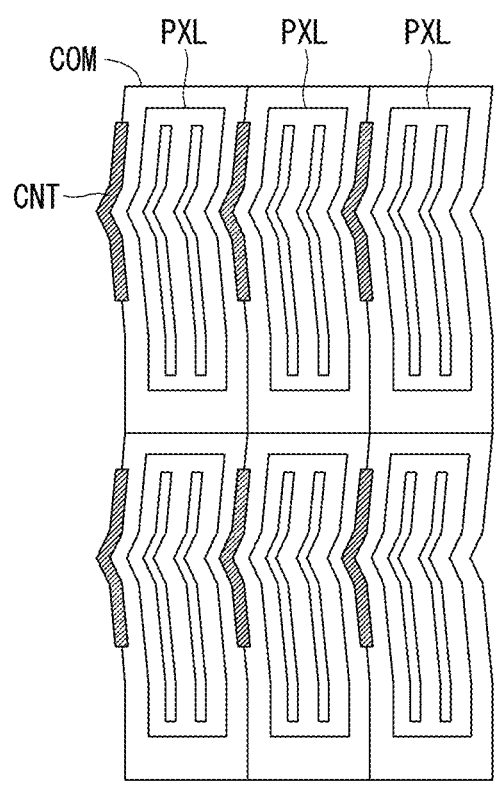
Figure 6D:
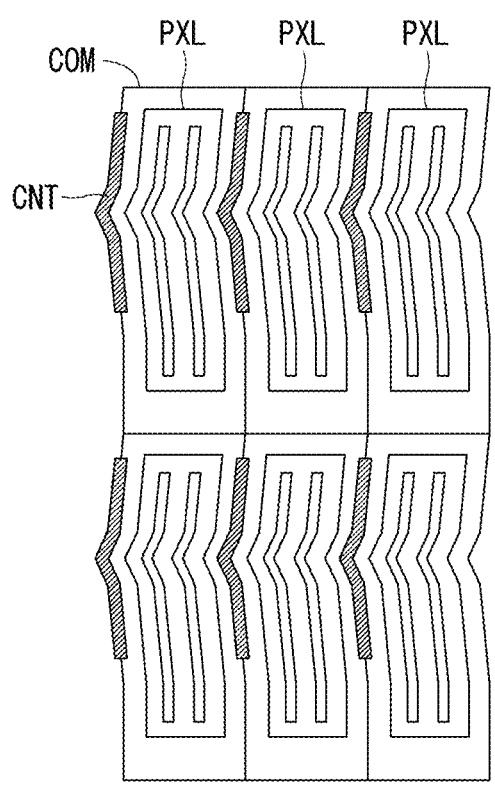
Figure 6E:
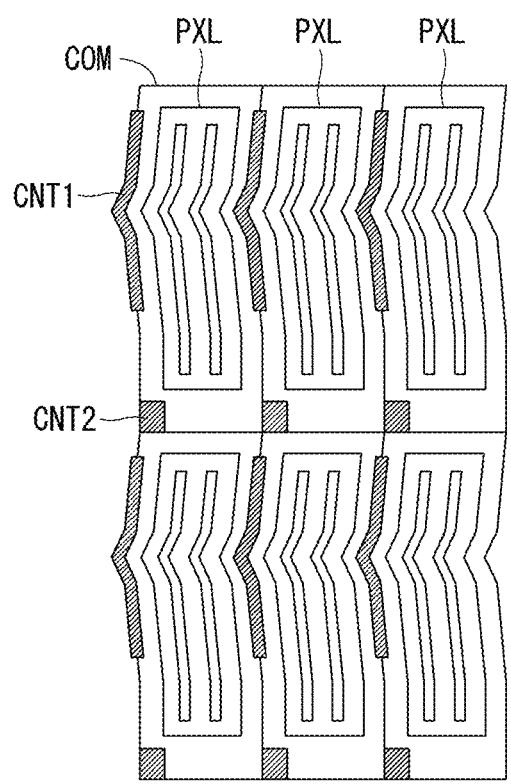

| Drawing | | FIG. 6A | FIG. 6B | FIG. 6C | FIG. 6D | FIG. 6E |
| --- | --- | --- | --- | --- | --- | --- |
| Contact area of alignment layer | Pixel electrode (PXL) | 4776.0 $\mu m^2$ | 4776.0 $\mu m^2$ | 4776.0 $\mu m^2$ | 4776.0 $\mu m^2$ | 4776.0 $\mu m^2$ |
| | Common electrode (COM) | 729.1 $\mu m^2$ | 727.4 $\mu m^2$ | 1212.8 $\mu m^2$ | 1480.6 $\mu m^2$ | 2303.9 $\mu m^2$ |
| Ratio of contact area (PXL:COM) | | 6:1 | 6:1 | 4:1 | 3:1 | 2:1 |
| Contact location | | Contact on both sides of data line in each subpixel | Contact on one side of data line in each subpixel | Increase in contact area on both sides of data line in each subpixel | Further increase in contact area on both sides of data line in each subpixel | Contact on both sides of data line and contact at a location of spacer in each subpixel |

FIG. 7 is an enlarged plan view of one subpixel in the liquid crystal display according to the first example embodiment of the invention. FIG. 8 is a cross-sectional view taken along line I-I' in FIG. 7 and shows a cross-sectional structure of the liquid crystal display. FIG. 9 is a cross-sectional view showing the conductive connectors CNT1 and CNT2 shown in FIG. 6E. The liquid crystal display shown in FIGS. 7 to 9 includes the lower plate of the structure shown in FIG. 2.

The common electrode COM is formed on the organic passivation layer PAC. The second inorganic passivation layer PAS1 is formed of an inorganic insulating material, such as SiOx and SiNx, and covers the common electrode COM. The conductive connector CNT is connected to the common electrode COM through a contact hole passing through the second inorganic passivation layer PAS1. The pixel electrode PXL is formed on the second inorganic passivation layer PAS1 and overlaps the common electrode COM. The pixel electrode PXL and the conductive connector CNT may be simultaneously formed using the same material. The pixel electrode PXL contacts the source electrode S of the TFT through the contact hole CH.

The lower alignment layer PI is formed on the second inorganic passivation layer PAS1 and covers the pixel electrode PXL and the conductive connector CNT. The lower alignment layer PI directly contacts the pixel electrode PXL and is connected to the common electrode COM through the conductive connector CNT. The lower alignment layer PI contacts the negative liquid crystal nLC on the lower plate and is photoaligned. Hence, the lower alignment layer PI sets the pretilt angle of the liquid crystal molecules.

The upper plate may include a black matrix BM, a color filter CF, an upper alignment layer PI, and a column spacer CS. The black matrix BM and the color filter CF are formed on an upper substrate SUBS2. The upper alignment layer PI contacts the negative liquid crystal nLC on the upper plate and is photoaligned. Hence, the upper alignment layer PI sets the pretilt angle of the liquid crystal molecules. The column spacer CS is formed between the upper plate and the lower plate and maintains a cell gap of the negative liquid crystal layer.

The relative positions of the pixel electrode PXL and the common electrode COM in the liquid crystal display according to the second example embodiment of the invention are reversed from the relative position of the pixel electrode PXL and the common electrode COM in the liquid crystal display shown in FIGS. 7 to 9, except that the pixel electrode PXL is connected to the TFT.

Figure 10:
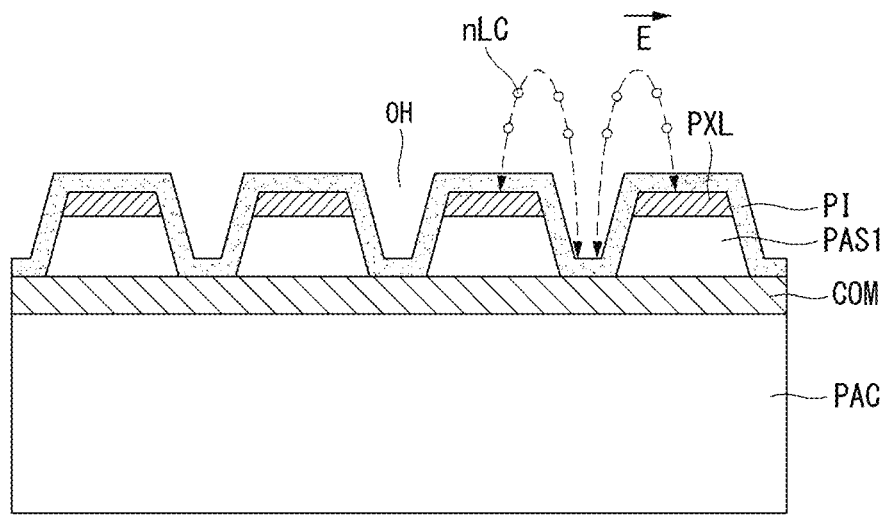
FIG. 10 shows a structure of a lower plate of a liquid crystal display according to a third example embodiment of the invention.

FIG. 10 shows a structure of a lower plate of a liquid crystal display according to a third example embodiment of the invention.

As shown in FIG. 10, the liquid crystal display according to the third example embodiment of the invention includes a pixel electrode PXL disposed over a common electrode COM with an insulating layer interposed therebetween and an alignment layer PI contacting the pixel electrode PXL and the common electrode COM. A passivation layer PAS1 may be an insulating layer formed between the common electrode COM and the pixel electrode PXL.

In the third example embodiment of the invention, the common electrode COM is a lower electrode positioned under the pixel electrode PXL, and the pixel electrode PXL is an upper electrode.

The passivation layer PAS1 has an open hole OH exposing the common electrode COM. The open holes OH may expose the common electrode COM in all areas except those covered by the pixel electrode PXL. For example, the open holes OH may expose the common electrode COM between the pixel electrodes PXL in open areas of the pixel and also expose the common electrode COM in other areas covered by the black matrix (not shown). The alignment layer PI contacts the pixel electrode PXL and also contacts the common electrode COM through the open hole OH. Because the alignment layer PI is directly connected to the pixel electrode PXL and the common electrode COM, ions accumulated on the alignment layer PI may be discharged through the pixel electrode PXL and the common electrode COM.

Because the open holes OH may expose the common electrode COM at portions not covered by the pixel electrode PXL, a contact area between the alignment layer PI and the common electrode COM in the third example embodiment may be greater than the contact area in the above-described example embodiments. If the contact area between the alignment layer PI and the common electrode COM decreases or a contact resistance therebetween increases, the extent to which the image persistence and the flicker are mitigated may depend on a material used for the alignment layer PI. According to the experimental results, if the contact area between the alignment layer PI and the common electrode COM increases as shown in FIG. 10, the image persistence and the flicker may be remarkably mitigated even with a variation in the composition or the physical properties of the alignment layer PI.

Figure 11:
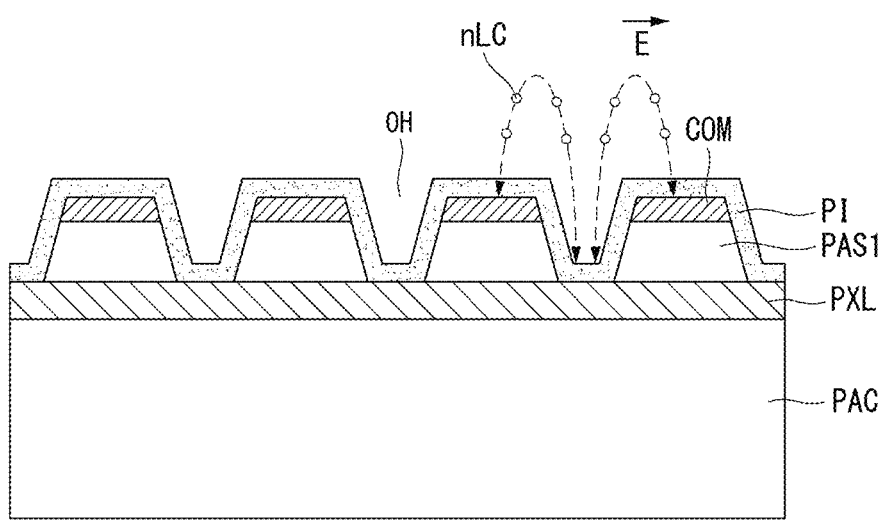
FIG. 11 shows a structure of a lower plate of a liquid crystal display according to a fourth example embodiment of the invention.

FIG. 11 shows a structure of a lower plate of a liquid crystal display according to a fourth example embodiment of the invention.

As shown in FIG. 11, the liquid crystal display according to the fourth example embodiment of the invention includes a common electrode COM disposed over a pixel electrode PXL with an insulating layer interposed therebetween and an alignment layer PI contacting the pixel electrode PXL and the common electrode COM. A passivation layer PAS1 may be an insulating layer formed between the common electrode COM and the pixel electrode PXL.

In the fourth example embodiment of the invention, the pixel electrode PXL is a lower electrode positioned under the common electrode COM, and the common electrode COM is an upper electrode.

A passivation layer PAS1 has an open hole OH exposing the pixel electrode PXL. For example, the open holes OH may expose the pixel electrode PXL between the common electrodes COM in an open area of the pixel. The alignment layer PI contacts the pixel electrode PXL and also contacts the common electrode COM through the open hole OH. Because the alignment layer PI is directly connected to the pixel electrode PXL and the common electrode COM, ions accumulated on the alignment layer PI may be discharged through the pixel electrode PXL and the common electrode COM.

The fourth example embodiment of the invention is substantially the same as the third example embodiment of the invention, except that positions of the common electrode COM and the pixel electrode PXL are reversed.

Figure 12:
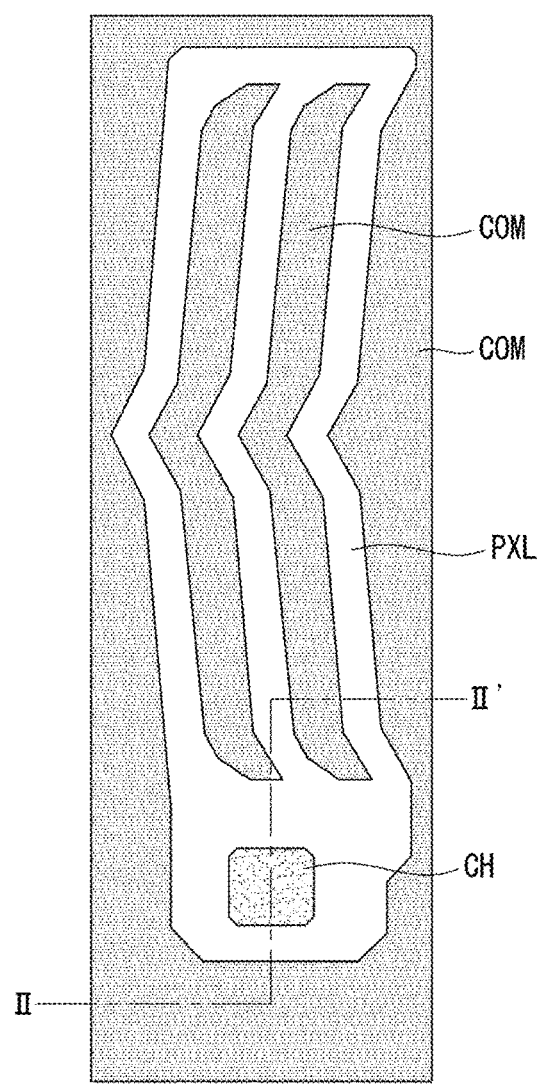
FIG. 12 is an enlarged plan view of one subpixel in a liquid crystal display according to the third example embodiment of the invention.
Figure 13:
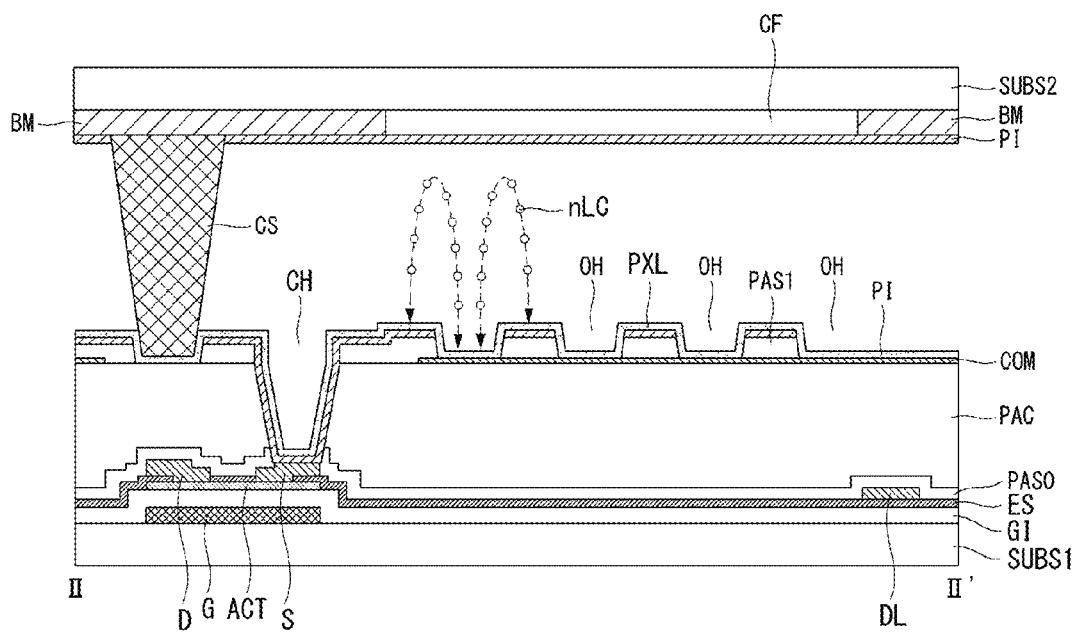
FIG. 13 is a cross-sectional view taken along line II-II' in FIG. 12 and shows a cross-sectional structure of a liquid crystal display according to the third example embodiment of the invention.

FIG. 12 is an enlarged plan view of one subpixel in the liquid crystal display according to the third example embodiment of the invention. FIG. 13 is a cross-sectional view taken along line II-II' in FIG. 12 and shows a cross-sectional structure of the liquid crystal display according to the third example embodiment shown FIG. 12.

As shown in FIGS. 12 and 13, the liquid crystal display according to the third embodiment of the invention may include an upper plate and a lower plate, which are attached to each other with a liquid crystal layer interposed therebetween. The structure of the upper plate may be substantially the same as the above-described example embodiments. The lower plate may include a TFT, a gate insulating layer GI, an etch stopper ES, a first inorganic passivation layer PAS0, an organic passivation layer PAC, a common electrode COM, a second inorganic passivation layer PAS1, a pixel electrode PXL, and a lower alignment layer PI.

The gate line GL and a gate electrode G of the TFT may be formed on a lower substrate SUBS1. The gate insulating layer GI may be formed of an inorganic insulating material, such as SiOx and SiNx, and cover the gate electrode G of the TFT. The gate electrode G of the TFT may be integrated with the gate line GL. A semiconductor pattern ACT is formed on the gate insulating layer GI and overlaps the gate G of the TFT. The semiconductor pattern ACT may be formed of a semiconductor material, such as amorphous silicon (a-Si), low temperature polysilicon (LTPS), and oxide semiconductor, and may be used as an active channel layer of the TFT.

A source electrode S and a drain electrode D of the TFT may be formed on the semiconductor pattern ACT and overlap the gate G of the TFT. The drain electrode D of the TFT may be integrated with the data line DL. The source electrode S of the TFT may contact the pixel electrode PXL through a contact hole CH passing through the first inorganic passivation layer PAS0, the organic passivation layer PAC, and the second inorganic passivation layer PAS1. The etch stopper ES may be formed of an inorganic insulating material, such as SiOx, and be formed on the semiconductor pattern ACT and the gate insulating layer GI. The etch stopper ES may protect the semiconductor pattern ACT from an etchant when the source electrode S and the drain electrode D of the TFT are etched. The first inorganic passivation layer PAS0 may be formed of an inorganic insulating material, such as SiOx and SiNx, and cover the TFT and the etch stopper ES. The organic passivation layer PAC may be formed of an organic insulating material, such as photo-acryl, and cover the first inorganic passivation layer PAS0. The common electrode COM and the pixel electrode PXL may be formed of a transparent electrode material, such as indium tin oxide (ITO).

The common electrode COM may be formed on the organic passivation layer PAC. The second inorganic passivation layer PAS1 may be formed of an inorganic insulating material, such as SiOx and SiNx, and cover a portion of the common electrode COM. The second inorganic passivation layer PAS1 may have an open hole OH exposing the common electrode COM. Because the open holes OH are patterned using a pixel electrode pattern as a mask, the open holes OH expose the common electrode COM at all areas not covered by the pixel electrode PXL.

The pixel electrode PXL may be formed on the second inorganic passivation layer PAS1 and overlap the common electrode COM. The pixel electrode PXL may contact the source electrode S of the TFT through the contact hole CH.

The lower alignment layer PI may be formed on the second inorganic passivation layer PAS1 to cover the pixel electrode PXL and to cover the common electrode COM through the open hole OH. The lower alignment layer PI directly contacts the pixel electrode PXL and the common electrode COM. The lower alignment layer PI may contact the negative liquid crystal nLC on the lower plate and be photoaligned. Hence, the lower alignment layer PI sets the pretilt angle of the liquid crystal molecules.

If the positions of the pixel electrode PXL and the common electrode COM are reversed and the pixel electrode PXL is connected to the TFT in the liquid crystal display shown in FIGS. 12 and 13, the resulting structure of the liquid crystal display would be substantially the same as the structure of the liquid crystal display according to the fourth example embodiment shown in FIG. 11.

Figure 14:
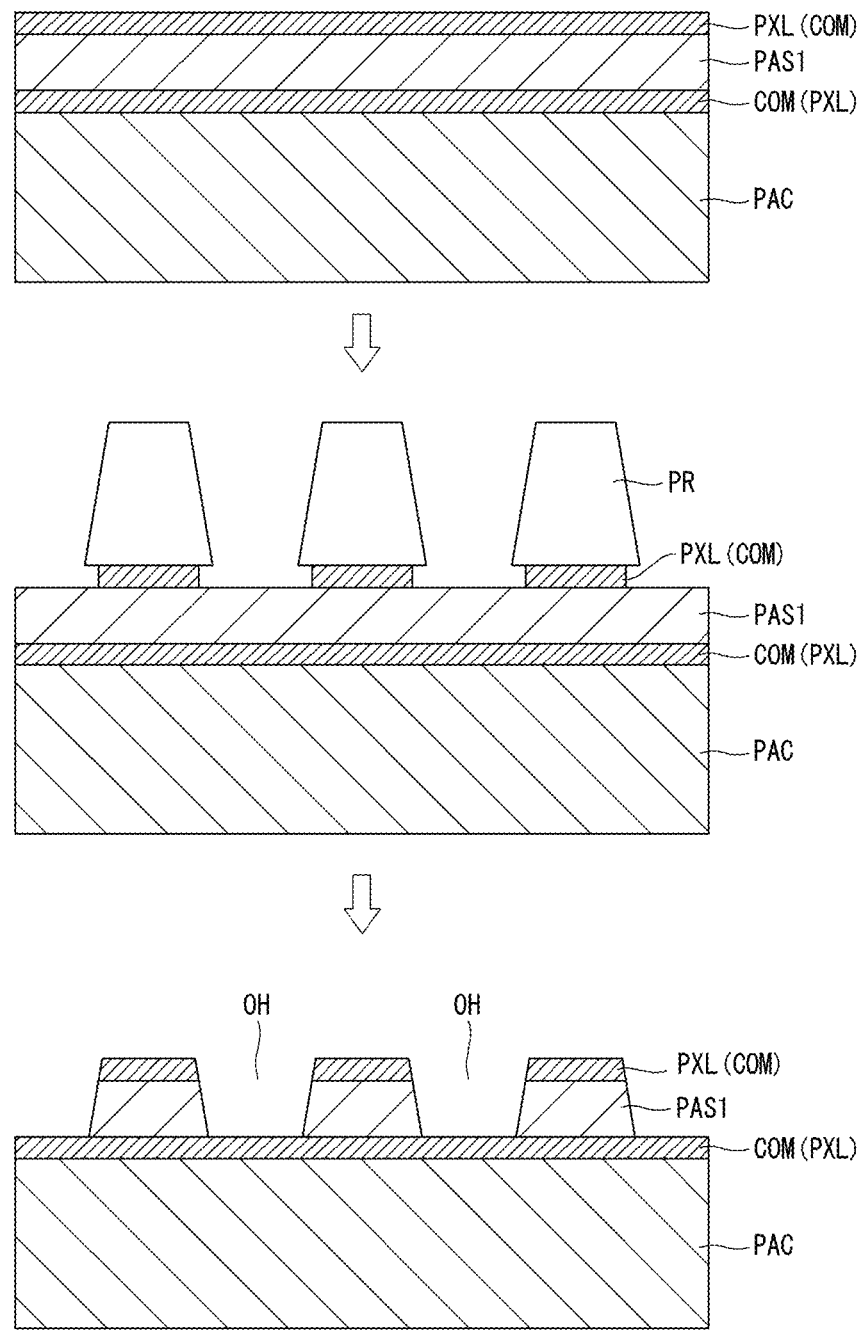
FIG. 14 is a cross-sectional view illustrating a method for forming an open hole in the liquid crystal display shown in FIG. 13.

FIG. 14 is a cross-sectional view showing a method for forming the open holes OH in the liquid crystal display shown, for example, in FIG. 13.

As shown in FIG. 14, the passivation layer PAS1 and a pixel electrode material layer may be stacked on the common electrode COM.

The passivation layer PAS1 and the pixel electrode PXL may be patterned through one photolithography process. A photoresist is applied to the pixel electrode material layer, and a photomask is aligned on the photoresist. An exposure process and a development process are performed to pattern the photoresist. Hence, a photoresist pattern PR is formed on the pixel electrode material layer.

In an example embodiment of the invention, a wet etching process may be performed to leave only the portions of the pixel electrode material layer covered by the photoresist pattern PR and to remove the other portions of the pixel electrode material layer. Hence, the pixel electrode PXL is formed on the passivation layer PAS1. Subsequently, in this example embodiment of the invention, a dry etching process may be performed, with the photoresist pattern PR remaining in place, to etch the portions of the passivation layer not covered by the photoresist pattern PR. Hence, the open holes OH exposing the common electrode COM may be formed. The alignment layer PI (not shown in FIG. 14) may then be applied over the entire lower plate. The alignment layer PI then contacts the pixel electrode PXL and also contacts the common electrode COM through the open holes OH.

If the positions of the pixel electrode PXL and the common electrode COM are reversed in the liquid crystal display shown in FIG. 14, the resulting structure of the liquid crystal display would be substantially the same as the structure of the liquid crystal display shown in FIG. 11.

The liquid crystal display according to the example embodiments of the invention includes a pixel electrode PXL and a common electrode COM that overlap each other in a vertical direction and form a storage capacitor Cst between them. As a result, the example embodiments of the invention bring the alignment layer PI into contact with the pixel electrode PXL and the common electrode COM, thereby mitigating the image persistence and the flicker of the liquid crystal display. Further, because a separate wide storage capacitor Cst may not necessarily be formed in the pixel in the example embodiments of the invention, it is possible to increase the aperture ratio of the pixel. This possible increase in the aperture ratio is described in more detail with reference to FIGS. 15A, 15B, 16 and 17.

Figure 15A:
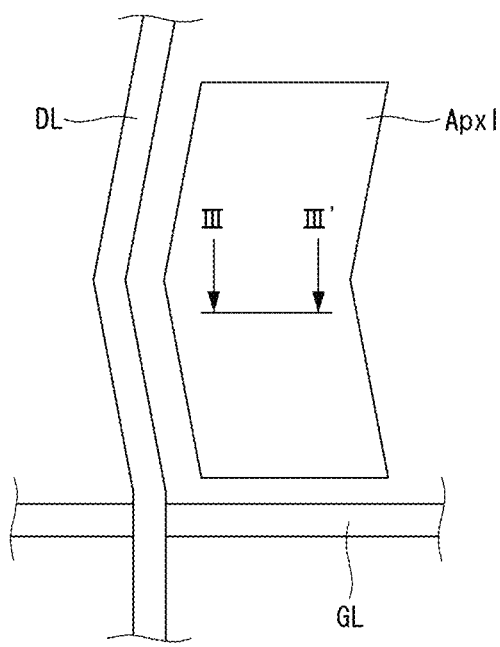
FIGS. 15A and 15B are plane views showing a comparison between an example embodiment of the invention and a comparative example with respect to an open area of a pixel structure.
Figure 15B:
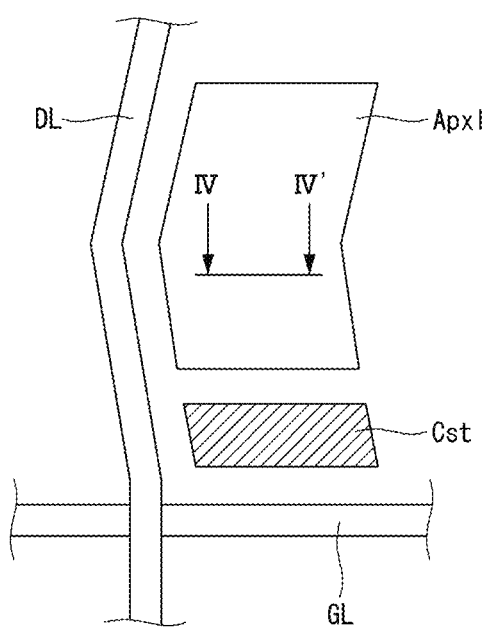
Figure 16:
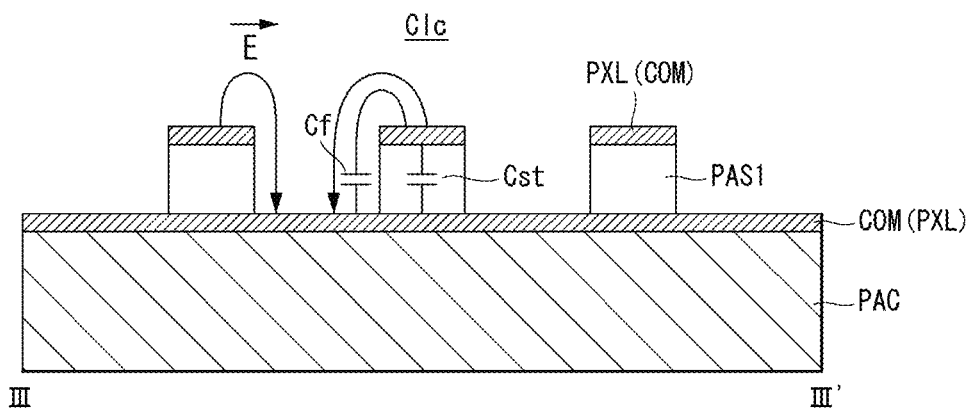
FIG. 16 is a cross-sectional view taken along line III-III' in FIG. 15A and shows a cross-sectional structure of a lower plate of a liquid crystal display.
Figure 17:
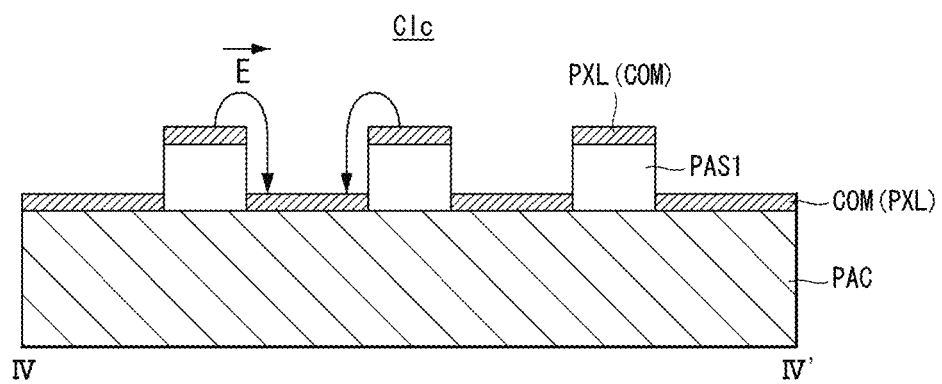
FIG. 17 is a cross-sectional view taken along line IV-IV' in FIG. 15B and shows a cross-sectional structure of a lower plate of a liquid crystal display.

FIGS. 15A, 15B, 16, and 17 show a comparison between a pixel structure according to an example embodiment of the invention and a pixel structure according to a comparative example. In the comparative example, as shown in FIGS. 15B and 17, the common electrode COM is disposed in the open holes passing through the insulating layer PAS1, and the pixel electrode PXL and the common electrode COM do not overlap each other. The comparative example, which is not a widely known related art device, has a pixel structure somewhat similar to the example embodiment of the invention, but is different from the example embodiment of the invention in the structure of the storage capacitor.

FIGS. 15A and 15B are plan views showing a comparison between an example embodiment of the invention and a comparative example with respect to an open area of a pixel structure. FIGS. 16 and 17 are cross-sectional views taken along lines III-III' and IV-IV' in FIGS. 15A and 15B, respectively, and show a cross-sectional structure of a lower plate of a liquid crystal display.

FIGS. 15A and 16 show the pixel structure according to the example embodiment of the invention shown in FIGS. 11 and 12, and FIGS. 15B and 17 show the pixel structure according to the comparative example.

In the pixel structure according to the example embodiment of the invention, because the pixel electrode PXL and the common electrode COM overlap each other, the storage capacitor Cst is formed between the pixel electrode PXL and the common electrode COM. On the other hand, in the pixel structure according to the comparative example, because the pixel electrode PXL and the common electrode COM do not overlap each other, a storage capacitor Cst having a wide area has to be separately provided. Thus, the example embodiment of the invention may further increase the open area of the pixel compared to the comparative example, thereby increasing the aperture ratio and the transmittance of the pixel.

Further, because a fringe field capacitance between the pixel electrode PXL and the common electrode COM in the example embodiment of the invention is greater than that in the comparative example, the liquid crystal molecules may be driven with a stronger fringe field in the example embodiment of the invention than in the comparative example.

As described above, the liquid crystal display according to the example embodiments of the invention includes the upper electrode and the lower electrode that overlap each other with the insulating layer interposed therebetween. The liquid crystal display according to the example embodiments allows the alignment layer to be in contact with the lower electrode through the contact hole passing through the insulating layer. Hence, the example embodiments of the invention have the alignment layer in contact with the upper electrode and the lower electrode to form a discharge path of ions accumulated on the alignment layer, thereby preventing or reducing the accumulation of ions in the normal driving mode and the low speed driving mode. As a result, the example embodiments of the invention can prevent or lessen a reduction in the image quality resulting from the image persistence and the flicker. Further, the example embodiments of the invention may improve the image quality in the low speed driving mode with the use of a negative liquid crystal, the photoalignment layer, and the oxide TFT.

It will be apparent to those skilled in the art that various modifications and variations can be made in the liquid crystal display of the present invention without departing from the spirit or scope of the invention. Thus, it is intended that the present invention cover the modifications and variations of the disclosed and illustrated example embodiments, provided they come within the scope of the appended claims and their equivalents.

What is claimed is:

1. A liquid crystal display, comprising:
   an upper plate and a lower plate with a liquid crystal layer interposed therebetween; and
   a spacer positioned between the upper plate and the lower plate,
   wherein the lower plate includes:
      a lower electrode,
      an insulating layer over the lower electrode,
      an upper electrode over the insulating layer,
      a thin film transistor (TFT) connected to at least one of the lower electrode and the upper electrode, and
      an alignment layer connected to the lower electrode and the upper electrode,
   wherein the alignment layer is connected to the lower electrode via a conductive connector disposed in a hole passing through the insulating layer and contacting the lower electrode, and
   wherein the conductive connector overlaps with the spacer and with the TFT in plan view.

2. The liquid crystal display of claim 1, wherein the lower electrode is a common electrode configured to receive a common voltage, and
   wherein the upper electrode is a pixel electrode configured to receive a data voltage.

3. The liquid crystal display of claim 1, wherein the upper electrode is a common electrode configured to receive a common voltage, and
   wherein the lower electrode is a pixel electrode configured to receive a data voltage.

4. The liquid crystal display of claim 1, wherein the alignment layer contacts the conductive connector.

5. The liquid crystal display of claim 4, wherein the conductive connector is formed of a same material as the upper electrode.

6. The liquid crystal display of claim 4, wherein the lower plate further includes a data line and a gate line crossing each other, and
   wherein the conductive connector overlaps with the data line in plan view.

7. The liquid crystal display of claim 4, wherein the upper plate includes a black matrix,
   wherein the conductive connector overlaps the black matrix in plan view.

8. The liquid crystal display of claim 1, wherein the hole exposes a portion of the lower electrode not covered by the upper electrode.

9. The liquid crystal display of claim 1, wherein the alignment layer is disposed on the upper electrode and directly contacts the upper electrode without a use of a contact hole passing through the insulating layer.

10. The liquid crystal display of claim 1, wherein the alignment layer is connected to the lower electrode and the upper electrode to form a discharge path of ions accumulated on the alignment layer.

11. The liquid crystal display of claim 1, wherein the liquid crystal layer includes a negative liquid crystal.

12. The liquid crystal display of claim 1, wherein the lower plate further includes:
   a data line and a gate line crossing each other,
   wherein the TFT is an oxide TFT disposed between the data line and the gate line.

13. The liquid crystal display of claim 1, wherein the alignment layer is a photoalignment layer.

14. The liquid crystal display of claim 1, wherein the upper electrode and the lower electrode overlap each other to form a storage capacitor.

* * * * *